_United States Patent Office_

3,215,683
Patented Nov. 2, 1965

3,215,683
PURIFICATION OF POLYOLEFINS
Bert H. Mahlman, West Chester, Pa., assignor to Hercules Powder Company, Wilmington, Del., a corporation of Delaware
No Drawing. Filed Nov. 1, 1956, Ser. No. 619,683
27 Claims. (Cl. 260—94.9)

This invention relates to the purification of polyolefins produced by low pressure processes and, more particularly, to the addition of a primary alcohol containing at least 4 carbon atoms to the reaction mixture at the end of the polymerization in the low pressure polymerization of olefins, separating the insoluble polymer from the reaction mixture, and washing the polymer with a liquid hydrocarbon whereby a polymer essentially free of catalyst residues is obtained.

K. Ziegler has described a new process of polymerizing ethylene and other 1-olefins under relatively mild conditions of temperature and pressure by using as the catalyst for the polymerization a mixture of a compound of a metal of Groups IV-B, V-B, VI-B or VIII of the Periodic Table or manganese, in combination with an organometallic compound of an alkali metal, alkaline earth metal, zinc, earth metal (especially aluminum), or rare earth metal. The process is usually carried out by mixing the two catalyst components in a hydrocarbon diluent and passing the ethylene or other olefin into the catalyst mixture at atmospheric or slightly elevated pressure and at room temperature or moderately elevated temperatures. When ethylene is so polymerized, a highly crystalline polyethylene is obtained that has many important industrial uses. In the process the polymer which is insoluble in the reaction medium precipitates out and is separated by any of the usual means such as filtration, centrifugation, etc. However, the polymer so produced contains large quantities of catalyst residues which greatly affect the color of the polymer, particularly when molded, and which also affect its electrical properties to such an extent that the use of the polymer for electrical insulation, etc., is prohibited. It has been suggested that these catalyst residues could be removed by treating the polymer with mineral acids, as for example, methanolic hydrochloric acid, aqueous solutions of nitric acid, et. However, the polymer so treated still contains an appreciable amount of catalyst residue. Furthermore, the corrosion of apparatus that is encountered in the use of such acid treatments makes it impractical on a commercial scale.

Now, in accordance with this invention, it has been found that polymers produced by such catalytic polymerization processes and essentially free from such catalyst residues, or with such residues reduced to the point that color and electrical properties are not impaired, may be obtained if at the end of the polymerization reaction a primary alcohol containing at least 4 carbon atoms is added to the reaction mixture and the insoluble polymer is then separated from the liquid phase and washed with a liquid hydrocarbon. By this means a polymer is obtained that is essentially free of catalyst residues and hence is not subject to discloration when subjected to molding and other plastic operations and in which the dielectric loss is greatly minimized so that the polymer may be used for electrical insulation.

This method of removing the catalyst residues may be applied to the polymer produced in the polymerization of any olefin with the Ziegler catalyst system or modifications thereof. Thus, any ethylenically unsaturated hydrocarbon or mixtures thereof may be polymerized and then purified by the process of this invention, as for example, hydrocarbons containing vinylidene, vinyl, or vinylene groups. The invention is of particular importance in the case of the polymerization of monoethylenically unsaturated hydrocarbons wherein the unsaturated group is a vinylidene group, which compounds have the general formula

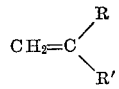

where R is alkyl and R' is alkyl, cycloalkyl, aralkyl, aryl, or alkaryl and those wherein the vinylidene group is a vinyl group, which compounds have the general formula $CH_2=CHR$ where R is hydrogen, a linear alkyl, a branched chain alkyl, cycloalkyl, aryl, aralkyl, or alkaryl, and for the polymerization of polyethylenically unsaturated hydrocarbons such as conjugated diolefin. Exemplary of the ethylenically unsaturated hydrocarbons which may be polymerized and then purified in accordance with this invention are the linear 1-olefins such as ethylene, propylene, butene-1, hexene-1, heptene-1, octene-1, octadecene-1, dodecene-1, etc., and branched chain 1-olefins and other olefins such as isobutylene, cis-butene, diisobutylene, tert-butylethylene, 4- and 5-methylheptenes-1, tetramethylethylene, and substituted derivatives thereof such as styrene, α-methylstyrene, vinylcyclohexane, diolefins such as hexadiene-1,4,6-methylheptadiene-1,5 and conjugated diolefins such as butadiene, isoprene, pentadiene-1,3, cyclic olefins such as cyclopentadiene, cyclohexene, 4-vinylcyclohexene-1, β-pinene, etc.

In accordance with the process taught by Ziegler, the olefin is contacted at relatively low pressure and temperature with a catalyst prepared by mixing a compound of a metal of Groups IV-B, V-B, VI-B or VIII of the Periodic Table or manganese with an organometallic compound of an alkali metal, alkaline earth metal, zinc or aluminum. The so-called transition metal compound may be an inorganic salt such as a halide, oxyhalide, etc., or an organic salt or complex such as an acetylacetonate, etc. Exemplary of the transition metal compounds that may be used are titanium and zirconium tetrachlorides, manganous chloride, nickelous chloride, ferrous chloride, ferric chloride, tetrabutyl titanate, zirconium acetylacetonate, vanadium oxyacetylacetonate, chromium acetylacetonate, etc. The organometallic compound that is reacted with one of the transition metal compounds or mixtures thereof may be any organo compound of an alkali metal, alkaline earth metal, zinc, earth metal, or rare earth metal, as for example, alkali metal alkyls or aryls such as butyllithium, amylsodium, phenylsodium, etc., dimethylmagnesium, diethylmagnesium, diethylzinc, butylmagnesium chloride, phenylmagnesium bromide, triethylaluminum, tripropylaluminum, triisobutylaluminum, trioctylaluminum, tridodecylaluminum, dimethylaluminum chloride, diethylaluminum bromide, diethylaluminum chloride, ethylaluminum dichloride, the equimolar mixture of the latter two known as aluminum sesquichloride, dipropylaluminum fluoride, diisobutylaluminum fluoride, diethylaluminum hydride, ethylaluminum dihydride, diisobutylaluminum hydride, etc., and complexes of such organometallic compounds, as for example, sodium aluminum tetraethyl, lithium aluminum tetraoctyl, etc.

Another method of carrying out the polymerization process is to use a two-component catalyst system. In one such system the insoluble precipitate which is formed by mixing the transition metal compound and the organometallic compound as described above is separated and then used in combination with an additional organometallic compound. The insoluble reaction product will be readily separated, if the reaction took place in an inert diluent, from the diluent and soluble reaction by-products by centrifuging, filtering, or any other desired means. In some cases it may be desirable to wash the insoluble reaction product with additional amounts of hydrocarbon diluent in order to completely remove all of the soluble by-products. This hydrocarbon-insoluble reaction product is then used in combination with any organometallic compound of a metal selected from the group of alkali metals, alkaline earth metals, zinc, earth metals, and rare earth metals, which compounds have already been exemplified above. This second catalyst component may be the same organometallic compound that was used in preparing the insoluble reaction product catalyst component or it may be a different organometallic compound. Of particular importance is the use of such a hydrocarbon-insoluble reaction product in combination with an aluminum trialkyl such as triethylaluminum, triisobutylaluminum, trioctylaluminum, etc.

In another two-component catalyst system, the whole reaction mixture formed on mixing a transition metal compound and an organometallic compound may be used in combination with an additional organometallic compound, if the latter is halogen-free. This two-component catalyst system is particularly useful for the polymerization of linear 1-olefins. Suitable halogen-free organometallic compounds that may be used as the second catalyst component in this system are alkali metal alkyls such as butyllithium, amylsodium, etc., dialkylmagnesium compounds such as dimethylmagnesium, diethylmagnesium, etc., alkylaluminum hydrides such as diisobutylaluminum hydride, etc., and trialkylaluminum such as trimethylaluminum, triethylaluminum, triisobutylaluminum, trioctylaluminum, etc.

In all of these processes the removal of the catalyst residue from the polymer is of paramount importance and the process of this invention makes it possible to overcome this difficulty. Even in the case where a soluble catalyst system is employed and the polymer contains relatively small catalyst residues, the process of this invention may be applied and so further reduce the catalyst residue in the polymer. Such a soluble catalyst is that particularly adapted for the polymerization of ethylene wherein the olefin is contacted with a mixture of an organometallic compound of a transition metal, such as bis(cyclopentadienyl)titanium dichloride, and an alkali metal alkyl alkaline earth metal alkyl, or an aluminum alkyl compound.

These polymerization processes are carried out in a wide variety of ways, as for example, as batch or continuous operations and with or without the use of an inert organic diluent as the reaction medium. Usually a diluent is preferred for carrying out the process. Any inert liquid organic solvent may be used as the diluent, as for example, aliphatic hydrocarbons such as hexane, heptane, isooctane, etc., cycloaliphatic hydrocarbons such as cyclohexane, aromatic hydrocarbons such as benzene, toluene, xylene, etc., or any mixture of such hydrocarbons, or halogenated aromatic hydrocarbons such as chlorobenzenes, chloronaphthalenes, etc. As pointed out already, the transition metal compound and the organometallic compound may be reacted in situ, as for example, in the particularly effective method of polymerizing diolefins wherein a trialkylaluminum is reacted in situ with a tetraalkyl titanate. They may also be reacted prior to the introduction of the olefin or they may be reacted and then used in combination with additional organometallic compound. They may also be added in increments during the polymerization and many other such variations may be utilized. Many other variations may be made in the polymerization system to which the purification process of this invention may be applied. For example, when lower molecular weight polymers are desired, a viscosity reducing agent such as a haloalkane, as for instance, carbon tetrachloride, etc., or hydrogen, or other such agent may be added.

The following examples will illustrate the process of purifying, in accordance with this invention, polyethylene produced by the low pressure processes. By the term "Reduced Specific Viscosity" (RSV) is meant the $\eta_{sp/c}$ determined on an 0.1% solution of the polymer in decalin, containing 0.1 g. of the polymer per 100 ml. of solution, at 135° C. All parts and percentages are by weight unless otherwise indicated.

*Examples 1–7*

In these examples ethylene was polymerized by passing the ethylene into a liquid hydrocarbon diluent in contact with a diethylaluminum chloride-titanium tetrachloride catalyst system. The amount of catalyst used ranged from 20–40 millimoles per liter of diluent. In each case the polymerization was carried out at 30–60° C. At the end of the polymerization there was added to the reaction mixture under nitrogen one part of butanol per 50 parts of diluent by volume. The reaction mixture was then stirred for 1 hour at room temperature and the solid polymer was separated from the organic liquids by filtration under nitrogen. The polymer was then washed with a liquid hydrocarbon three times by reslurrying the polymer solids in an amount of the diluent equal to the original polymerization diluent and in each case filtering under nitrogen. The polymer was then washed with methanol to remove the last traces of diluent and finally was dried. In Table I below are set forth the diluent used for each of the polymerizations, the viscosity of the polymer obtained (the reduced specific viscosity determined on an 0.1% solution of the polymer in decalin at 135° C.), the hydrocarbon used for washing the polymer and the inorganics present in the purified polymer.

TABLE I

| Example | Polymerization Diluent | RSV | Hydrocarbon Wash | Inorganic Content of Polymer | | |
|---|---|---|---|---|---|---|
| | | | | Percent Al | Percent Ti | Percent Cl |
| 1 | Isooctane | 1.7 | Toluene | 0.007 | 0.006 | 0.0 |
| 2 | n-Heptane | 2.9 | n-Heptane | 0.02 | 0.05 | 0.06 |
| 3 | do | 4.2 | do | 0.005 | 0.07 | 0.08 |
| 4 | Toluene | 4.3 | Toluene | 0.005 | 0.003 | 0.03 |
| 5 | n-Heptane | 5.6 | n-Heptane | 0.006 | 0.15 | 0.09 |
| 6 | do | 11.5 | do | 0.0037 | 0.09 | |
| 7 | Toluene | 16 | Toluene | 0.01 | 0.0022 | 0.03 |

*Examples 8–12*

In each of these examples ethylene was polymerized by passing the ethylene into a mixture of liquid hydrocarbons as diluent (boiling point of about 200°–240° C.) in contact with a two-component catalyst system at room temperature. The first catalyst component was the hydrocarbon insoluble reaction product obtained by mixing ethylaluminum sesquichloride with titanium tetrachloride in a hydrocarbon diluent, an amount of said catalyst component being used in the polymerization that is equivalent to about 10 millimoles of titanium tetrachloride being used per liter of diluent. This catalyst component was then used in combination with an additional quantity of ethylaluminum sesquichloride as the second catalyst component, the amount of the latter being added to the polymerization system depending upon the rate of the polymerization, etc., usually an amount of about 5–20 millimoles per liter of diluent. At the end of the polymerization reaction the polyethylene was in the form of a slurry (about 25% solids of polyethylene) in the hydrocarbon diluent of fairly dense particles having an average diameter of about 100–300 microns. To the reaction mixture in each case was then added n-butanol under an atmosphere of nitrogen and the reaction mixture was agitated, after which the polymer was separated by filtration, again under nitrogen, and washed with fresh diluent. In some of the examples the diluent remaining in the polymer after the final washing was removed by steam distillation and in others it was removed by washing with a low boiling aliphatic hydrocarbon. In Table II below are set forth the amount of n-butanol added to the reaction mixture, the length of time that the reaction mixture was agitated with the n-butanol and the temperature, the number of diluent washes applied to the filtered polymer, and whether steam distillation was or was not applied to the final polymer. The inorganic content of each of the so purified polymers is then set forth as indicated by the percent sulfate ash.

TABLE II

| Example | n-Butanol Treatment | | | No. of Washes | Steam Distillation | Percent Sulfate Ash |
|---|---|---|---|---|---|---|
| | Percent added | Time | °C. Temp. | | | |
| 8a | 2.0 | 2 hrs | 25 | 4 | No | 0.12 |
| 8b | 2.0 | 2 hrs | 25 | 4 | Yes | 0.08 |
| 9a | 0.1 | 2 hrs | 25 | 3 | No | 0.32 |
| 9b | 0.2 | 2 hrs | 25 | 3 | No | 0.33 |
| 9c | 0.3 | 2 hrs | 25 | 3 | No | 0.29 |
| 9d | 0.4 | 2 hrs | 25 | 3 | No | 0.24 |
| 9e | 0.5 | 2 hrs | 25 | 3 | No | 0.18 |
| 10a | 1.0 | 3 hrs | 25 | 4 | No | 0.13 |
| 10b | 1.0 | 10 min | 25 | 4 | No | 0.12 |
| 10c | 1.0 | 30 min | 25 | 4 | No | 0.13 |
| 10d | 1.0 | 60 min | 25 | 3 | No | 0.17 |
| 10e | 1.0 | 2 hrs | 25 | 3 | No | 0.17 |
| 10f | 1.0 | 2 hrs | 100 | 6 | No | 0.09 |
| 11a | 2.0 | 1 hr | 25 | 5 | Yes | 0.20 |
| 11b | 2.0 | 1 hr | 100 | 5 | Yes | 0.07 |
| 11c | 2.0 | 10 min | 25 | 5 | Yes | 0.22 |
| 11d | 2.0 | 10 min | 100 | 5 | Yes | 0.09 |
| 12a | 2.0 | 30 min | 25 | 5 | Yes | 0.16 |
| 12b | 2.0 | 30 min | 70 | 5 | Yes | 0.06 |

*Example 13*

Ethylene was polymerized by contact at 50°–80° C. with a diethylaluminum chloride-titanium tetrachloride catalyst used in combination with ethylaluminum sesquichlorides in a mixture of liquid aliphatic hydrocarbons having a boiling point of 200°–240° C. as described in the foregoing examples. To the polymer slurry so obtained was added under a nitrogen atmosphere n-butanol in an amount equal to 2% of the total volume. The mixture was agitated at room temperature for 1 hour and then filtered under nitrogen on a sintered glass filter. The polymer filter cake was then washed several times with fresh diluent (the same aliphatic hydrocarbon mixture that was used as the diluent in the polymerization). In each filtration or washing operation the liquid was drawn off to the level of the top of the filter cake and replaced with fresh diluent. The percent sulfate ash in the filtrate after each wash is tabulated below.

Filtrate sample: Percent sulfate ash
Slurry _____ 0.14
1st wash _____ 0.14
2nd wash _____ 0.13
3rd wash _____ 0.10
4th wash _____ 0.05
5th wash _____ 0.03
6th wash _____ 0.01
7th wash _____ 0.02
8th wash _____ 0.01
9th wash _____ 0.02
10th wash _____ Nil
11th wash _____ Nil
12th wash _____ Nil

*Example 14*

Ethylene was polymerized by the process described in Examples 8–14. To the polymer slurry so obtained was added an amount of n-butanol equal to 2% of the diluent volume and the mixture was agitated for 16 hours, starting at 77° C. and gradually cooling to room temperature. The polymer was separated by filtration (nitrogen atmosphere) and was washed 5 times with fresh diluent and then 3 times with hexane, after which it was stirred with a warm 0.1% aqueous solution of sodium hydroxide. It was then water-washed to neutrality and vacuum-dried. The polymer so purified had a sulfate ash of 0.02% and contained 0.006% chlorine.

*Example 15*

Ethylene was polymerized by the process described in Examples 8–14 except that n-heptane was used as the hydrocarbon diluent. To the polymer slurry in the hydrocarbon diluent so obtained was added an amount of 2-ethylhexanol equal to 4% of the diluent volume and the mixture was agitated for 2 hours at about 100° C. The polymer was separated by filtration under nitrogen and then was washed 3 times with n-heptane. The polymer so purified had a sulfate ash of 0.07%.

*Example 16*

Ethylene was polymerized by passing it into a solution of bis(cyclopentadienyl)titanium dichloride in toluene (1.2 parts per liter) at 30° C. while adding diethylaluminum chloride (2.78 parts per liter) and adding oxygen at the rate of 0.13 part per liter per hour. To the polymer slurry so obtained was added n-butanol, 2% by volume of the slurry, and the mixture was agitated for 30 minutes under nitrogen. The polymer was then separated by filtration and washed with toluene, both operations being carried out under nitrogen and in the absence of air. The polymer was then steam-distilled, filtered, washed with water, and vacuum-dried. The polyethylene so obtained and purified had a sulfate ash of 0.07% and contained 0.022% chlorine.

*Example 17*

Propylene was polymerized by passing the gas at 30 p.s.i.g. into a stirred mixture held at 50° C. of 430 parts of n-heptane, 0.79 part of triethylaluminum and the hydrocarbon-insoluble reaction product obtained by mixing 1.2 parts of titanium tetrachloride with 1.6 parts of ethylaluminum dichloride in n-heptane and allowing the mixture to stand 16 hours at room temperature. The polymerization was continued for 11.5 hours, an additional 0.14 part of triethylaluminum being added after about 6 hours. At this point the slurry of polypropylene in n-heptane had a solids content of about 20%. To the polymerization reaction mixture was then added 2% by volume of n-butanol and the mass was agitated at 50° C. for 30 minutes, the pressure decreasing to atmospheric and propylene gas being displaced with nitrogen. The polypropylene was then separated by filtration and washed 3 times with cold n-heptane. The polypropylene so obtained and purified had a sulfate ash of 0.05%.

As may be seen from the foregoing examples, the process of this invention makes it possible to produce a polyolefin by the low pressure process and essentially free from catalyst residues. Primary alcohols containing at least 4 carbon atoms are unique in their action in solubilizing these catalyst residues in such a manner that washing the polymer with fresh organic diluent essentially completely removes the catalyst residues from the polymer. Any primary alcohol containing at least 4 carbon atoms may be used in accordance with this invention. Exemplary of such alcohols are n-butanol, n-pentanol, 3-methyl-1-butanol, n-hexanol, 2-ethyl-1-hexanol, 1-nonanol, etc. The amount of the primary alcohol, such as n-butanol, added at the end of the polymerization may be varied widely and will depend chiefly upon the amount of catalyst used in the polymerization and other reaction conditions, but in general is from about 0.1% to about 10% of the volume of the polymer slurry, and preferably is from about 1% to about 5%. Much larger quantities may be used but are not believed to serve any useful purpose and hence are not usually desired for practical considerations. The alcohol treatment may be carried out at any desired or practical temperature, as may be seen from the above examples, but generally will be from about 0° C. to about 100° C., and preferably from about 25° C. to about 80° C. Only a short reaction time is required for the alcohol treatment, depending upon the temperature, catalyst, etc. In general, a period of from about 10 minutes to about 30 minutes is adequate but may be any length of time that is practical, as for example, overnight, etc. Preferably the alcohol treatment is carried out in an inert atmosphere, i.e., in the absence of oxygen, water, etc., and hence an oxygen- and water-free atmosphere is used, as for example, nitrogen or other inert gas.

After the alcohol treatment, the solid polymer is separated from the liquid phase by any desired means such as filtration, decantation, centrifugation, etc. The polymer is then subjected to a washing treatment with fresh quantities of a liquid hydrocarbon diluent which may be the same as that used in the polymerization reaction or different. This washing operation may be carried out by re-slurrying the polymer in the fresh diluent and again filtering, decanting, etc., or added directly to the filter cake in a filtration system, etc. The number of diluent washes and amount of diluent used for each wash will depend upon the degree of purity of the polymer desired. Usually maximum purity is achieved after a total of six washes, but more may be desirable. Obviously, any volume of the diluent may be used for the washing operation. Any liquid hydrocarbon or mixture of such hydrocarbons may be used for the washing operation, as for example, aliphatic hydrocarbons such as hexane, n-heptane, mixtures of petroleum hydrocarbons, etc., and aromatic hydrocarbons such as benzene, toluene, or xylene, etc. For practical considerations, the washing operation is usually carried out at room temperature but either or both the solids and wash liquid may be at elevated temperatures if desired. As with the alcohol treatment, the separation of the polymer, and diluent washing operations are preferably carried out in an oxygen- and water-free atmosphere as, for example, under nitrogen or other inert gas.

Obviously many variations may be made in the purification process of this invention. As illustrated by the foregoing examples, it may be desirable in some cases to subject the polymer to additional treatments after the n-butanol and diluent wash treatments. In some cases a simple drying operation may be adequate, whereas in others it may be preferable to subject the polymer to a steam distillation treatment before drying in order to remove all traces of the diluent wash liquid. Another method of further purifying the polymer is to follow the diluent wash operation with an aqueous alkali wash, as for example, an aqueous alkali metal hydroxide solution, followed by a water wash and drying. Any other aftertreatment may be applied to the polymer purified in accordance with this invention without departing from the scope of this invention.

The Periodic Table referred to throughout the specification and claims is that set forth in the "Handbook of Chemistry and Physics" published by Chemical Rubber Publishing Company, pages 392–393 of the 36th edition.

What I claim and desire to protect by Letters Patent is:

1. In the process of polymerizing an ethylenically unsaturated hydrocarbon in an inert liquid organic diluent with a catalyst comprising a compound of a metal selected from the group consisting of the metals of Groups IV–B, V–B, VI–B and VIII of the Periodic Table and manganese and an organometallic compound of a metal selected from the group consisting of alkali metals, alkaline earth metals, and earth metals, the step of removing the catalyst residues from the polymer which comprises adding to the polymerization reaction mixture containing the polymer a primary alcohol containing from 4 to 9 carbon atoms separating the solid polymer from the liquid phase, and then washing the solid polymer with a liquid hydrocarbon.

2. The process of claim 1 wherein the said primary alcohol is added to the polymerization reaction mixture in an inert atmosphere.

3. The process of claim 2 wherein the primary alcohol that is added to the polymerization reaction mixture is n-butanol.

4. The process of claim 3 wherein the ethylenically unsaturated hydrocarbon that is polymerized is ethylene.

5. The process of claim 4 wherein the n-butanol treatment is carried out at a temperature of from about 25° C. to about 80° C.

6. The process of claim 4 wherein the polymer is washed with a liquid aliphatic hydrocarbon.

7. The process of claim 4 wherein the polymer is washed with a liquid aromatic hydrocarbon.

8. The process of claim 5 wherein the hydrocarbon wash liquid is removed from the polymer by steam distillation.

9. The process of claim 6 wherein the hydrocarbon wash liquid is removed from the polymer by steam distillation.

10. In the process of polymerizing an ethylenically unsaturated hydrocarbon selected from the group consisting of ethylene and propylene in an inert liquid organic diluent with a catalyst comprising a compound of titanium and an alkylaluminum compound, the step of removing the catalyst residues from the polymer which comprises adding to the polymerization mixture containing the polymer a primary alcohol containing from 4 to 9 carbon atoms, separating the solid polymer from the liquid phase, and then washing the solid polymer with a liquid hydrocarbon.

11. In a process for making solid polyethylene having an average molecular weight above about 10,000, wherein ethylene is subjected to polymerizing conditions in the presence of an inert liquid hydrocarbon reaction medium and a polymerization catalyst obtained by reacting a reducible compound of a metal of groups IV$b$ to VI$b$, inclusive, of the periodic table with an organoaluminum compound selected from the class consisting of aluminum trialkyls, dialkyl aluminum halides and whereby there is obtained a crude polymerizate comprising said polyethylene, active catalyst and said reaction medium, the improved method for recovering said polyethylene which comprises: (1) admixing an aliphatic alcohol containing at least 4 carbon atoms with said crude polymerizate and maintaining the mixture so obtained at a temperature between about 60° C. and about 100° C. until the activity of said catalyst is destroyed; (2) separating the solid polyethylene from the so-treated polymerizate at a temperature between about 60° C. and about 100° C.; (3) washing the separated polyethylene with a liquid aliphatic hydrocarbon and separating the latter from the washed polyethylene; and (4) re-washing the polyethylene with a liquid aliphatic hydrocarbon.

12. A process as defined by claim 11 wherein the liquid aliphatic hydrocarbon employed in steps (2) and (4) is identical with the liquid aliphatic hydrocarbon reaction medium contained in the said crude polymerizate.

13. A process as defined by claim 11 wherein steps (1) and (2) are effected at a temperature between about 80° C. and about 100° C.

14. A process as defined by claim 11 wherein the aliphatic alcohol employed in step (1) is n-butanol.

15. A process as defined by claim 11 wherein the said polymerization catalyst is one obtained by reacting a reducible compound of titanium with a dialkyl aluminum halide.

16. A process as defined by claim 11 wherein the re-washed polyethylene obtained in step (4) is washed with a liquid selected from the class consisting of liquid aliphatic hydrocarbons and water.

17. A process as defined by claim 12 in which the said liquid aliphatic hydrocarbon boils between about 60° C. and about 250° C.

18. A process as defined by claim 15 wherein the said reducible compound of titanium is titanium tetrachloride and the said dialkyl aluminum halide is a dialkyl aluminum chloride.

19. The process for preparing polyethylene which comprises subjecting gaseous ethylene to polymerizing conditions in the presence of an inert liquid aliphatic hydrocarbon reaction medium and a polymerization catalyst obtained by reacting a reducible compound of a metal of groups IVb to VIb, inclusive, of the periodic table with an organo-aluminum compound selected from the class consisting of alumium trialkyls, dialkyl aluminum halides, and whereby there is obtained a crude polymerizate comprising solid polyethylene, active catalyst and said reaction medium; treating said crude polymerizate with an aliphatic alcohol containing at least 4 carbon atoms at a temperature between about 60° C. and about 100° C. for a period of time sufficient to deactivate said catalyst; separating solid polyethylene from the so-treated polymerizate at a temperature between about 60° C. and about 100° C.; washing the separated polyethylene with a liquid alialiphatic hydrocarbon; and re-washing the washed polyethylene with methanol.

20. A process as defined by claim 19 wherein the said reaction medium and the said aliphatic hydrocarbon washing liquid are the same and boil between about 60° C. and about 250° C.

21. A process as defined by claim 19 wherein the temperature at which the crude polymerizate is treated with the said alcohol and the temperature at which the solid polyethylene is separated from the so-treated polymerizate are between about 80° C. and about 100° C.

22. A process as defined by claim 19 wherein the said aliphatic alcohol is n-butanol.

23. A process as defined by claim 19 wherein the said polymerization catalyst is one obtained by reacting a reducible compound of titanium with a dialkyl aluminum halide.

24. A process as defined by claim 19 wherein the said polymerization catalyst is one obtained by reacting titanium tetrachloride with a dialkyl aluminum halide.

25. A process as defined by claim 19 wherein the rewashed solid polyethylene is washed with a liquid selected from the class consisting of liquid aliphatic hydrocarbons and water.

26. The process for preparing polyethylene which comprises subjecting ethylene to a temperature between about 20° C. and about 150° C. and a pressure between about 1 and about 100 atmospheres in the presence of a liquid aliphatic hydrocarbon reaction medium and a catalyst obtained by reacting a reducible compound of a metal of groups IVb to VIb, inclusive, of the periodic table with an organo-aluminum compound selected from the class consisting of aluminum trialkyls, and dialkyl aluminum halides, whereby there is obtained a crude polymerizate comprising solid polyethylene, said reaction medium and active catalyst; treating said polymerizate with between about 1 and about 10 percent by volume of an aliphatic alcohol containing at least 4 carbon atoms at a temperature between about 60° C. and about 100° C. for a period of time sufficient to deactivate said catalyst; separating solid polyethylene from the so-treated polymerizate at a temperature between about 60° C. and about 100° C.; washing the separated polyethylene with a liquid aliphatic hydrocarbon; and re-washing the washed polyethylene with methanol.

27. A process as defined by claim 26 wherein the liquid aliphatic hydrocarbon reaction medium and the liquid aliphatic hydrocarbon washing medium are the same and boil between about 60° C. and about 250° C.

References Cited by the Examiner

UNITED STATES PATENTS

| 2,683,139 | 7/54 | Leary et al. | 260—94.7 |
|---|---|---|---|
| 2,728,757 | 12/55 | Field et al. | 260—94.9 |
| 2,791,576 | 5/57 | Field | 260—94.9 |
| 2,827,446 | 3/58 | Breslow | 260—94.9 |
| 2,845,412 | 7/58 | Heyson | 260—94.9 |
| 2,867,612 | 1/59 | Pieper et al. | 260—94.9 |
| 2,874,153 | 2/59 | Bowman et al. | 260—93.7 |
| 2,886,561 | 5/59 | Reynolds et al. | 260—94.9 |
| 2,921,933 | 1/60 | McKinnis et al. | 260—94.9 |
| 3,012,023 | 12/61 | Anderson | 260—94.9 |

FOREIGN PATENTS

| 533,362 | 5/55 | Belgium. |
|---|---|---|
| 538,782 | 12/55 | Belgium. |

JOSEPH L. SCHOFER, *Primary Examiner.*

ALLEN M. BOETTCHER, B. E. LANHAM, LESLIE H. GASTON, JOSEPH R. LIEBERMAN, *Examiners.*